(12) United States Patent
Hanke

(10) Patent No.: US 6,890,025 B2
(45) Date of Patent: May 10, 2005

(54) GUIDE ARRANGEMENT FOR A ROOF ELEMENT ON AN OPENING VEHICLE ROOF

(75) Inventor: Michael Hanke, Pullach (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 0 days.

(21) Appl. No.: 10/468,777

(22) PCT Filed: Aug. 27, 2002

(86) PCT No.: PCT/EP02/09552

§ 371 (c)(1),
(2), (4) Date: Aug. 21, 2003

(87) PCT Pub. No.: WO03/022613

PCT Pub. Date: Mar. 20, 2003

(65) Prior Publication Data

US 2004/0090090 A1 May 13, 2004

(30) Foreign Application Priority Data

Sep. 11, 2001 (DE) .......................... 101 44 756

(51) Int. Cl.⁷ ............................................. B60J 7/057
(52) U.S. Cl. .................. 296/223; 296/216.08
(58) Field of Search ............................ 296/216.08, 223

(56) References Cited

U.S. PATENT DOCUMENTS

| 2,968,514 | A | | 1/1961 | Golde |
| 3,005,226 | A | | 10/1961 | Werner |
| 6,164,718 | A | * | 12/2000 | Stallfort ....................... 296/222 |
| 6,257,658 | B1 | * | 7/2001 | Nabuurs et al. ............ 296/223 |
| 6,325,453 | B1 | | 12/2001 | Manders |
| 6,361,104 | B2 | | 3/2002 | Tsuruo et al. |
| 6,471,286 | B1 | * | 10/2002 | Manders et al. ............ 296/223 |

FOREIGN PATENT DOCUMENTS

| DE | 195 14 585 A1 | 10/1996 |
| DE | 100 24 442 C1 | 8/2001 |
| NL | 6 807 210 | 11/1969 |

* cited by examiner

Primary Examiner—Dennis H. Pedder
(74) Attorney, Agent, or Firm—Nixon Peabody LLP; David S. Safran

(57) ABSTRACT

A guide arrangement for a roof element on an opening vehicle roof which includes a guide web connected to the roof element and a guide claw, having two opposing guide surfaces, which engages the guide web in such a manner that the guide surfaces lie on the guide web. The guide claw also includes an elastic element which provides adjustment for one of the two guide surfaces, such that the separation between the two opposing guide surfaces may be altered to provide tolerance adjustment.

15 Claims, 5 Drawing Sheets

GUIDE ARRANGEMENT FOR A ROOF ELEMENT ON AN OPENING VEHICLE ROOF

BACKGROUND OF THE INVENTION

1. Field of the Invention

This invention relates to a guide arrangement for a roof element for a motor vehicle roof.

2. Description of Related Art

One such generic guide arrangement is known from published German Patent Application DE 195 14 585 A1, a T-shaped guide web being formed on the bottom of a mounting element attached to the roof cover and the two guide surfaces being formed by a first cam and an abutment cam which is offset with respect to the first cam in the lengthwise direction. The guide claw can be made in one piece out of plastic and is movably guided in the lengthwise direction of the roof along a roof-mounted guide rail.

German Patent DE 100 24 442 C1, and U.S. Pat. Nos. 2,968,514 and 3,005,226 disclose guiding the cover of an openable motor vehicle roof along a roof-mounted guide rail by means of guide blocks which are attached to the cover, each guide block surrounding a horizontally projecting bridge in a U-shape, the guide block being provided with a flexible lining or plastic element in the engagement area.

In a slotted guide in which a link pin is movably guided in a link slot, tolerance equalization can be achieved by the link pin and the link slot being designed with an overlap, the slot width widening relative to the pin diameter. This is possible because the slot is relatively long and therefore the material which surrounds the slot acts as a spring. In a bridge guide (for example, a T-guide) this type of tolerance equalization cannot be achieved, because the bridge cannot be used as an elastic element. As a result, the problem arises that either the bridge guide or the guide claw rattle, because the width of the bridge, is less than the spacing of the retaining claws. Additionally, the problem arises that the two parts stick or can move only with a great application of force, which results in the wear of the contact surfaces being very large such that, after a certain number of actuations, rattling of the parts will occur.

SUMMARY OF THE INVENTION

The object of this invention is to devise a guide for a guide web in which good tolerance equalization is easily and expediently achieved in order to prevent both rattling and also stiffness or excess wear of the guide and guide web.

This object is achieved by a guide arrangement of the embodiments of the invention where the guide claw is provided with an elastic element and the distance between the two guide surfaces of the guide claw is variable for purposes of tolerance equalization.

The invention is explained in detail below by way of example using the attached drawings.

DETAILED DESCRIPTION OF THE INVENTION

Figure 1:
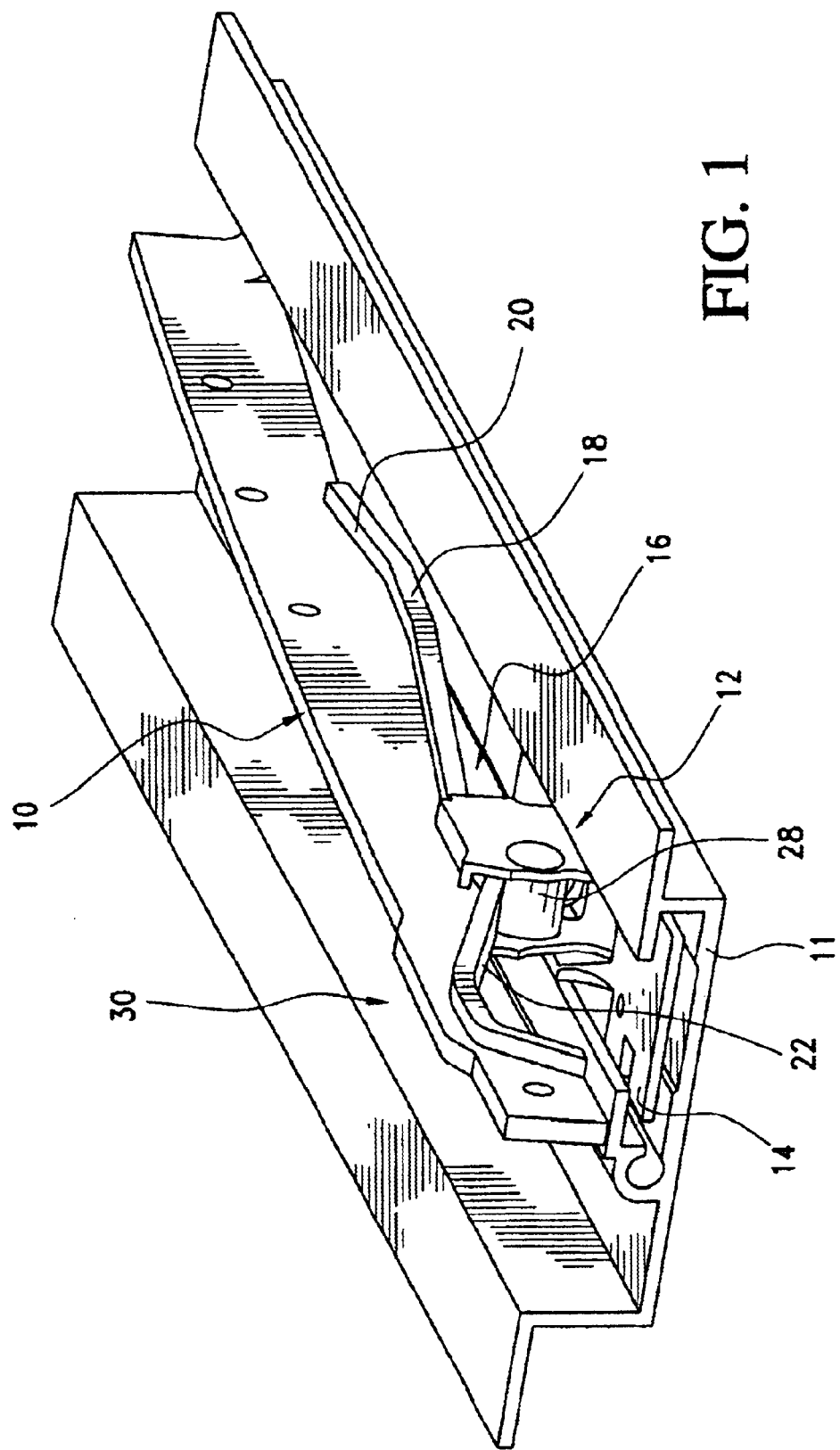
FIG. 1 shows a schematic perspective of the guide arrangement of the invention according to a first embodiment.
Figure 2:
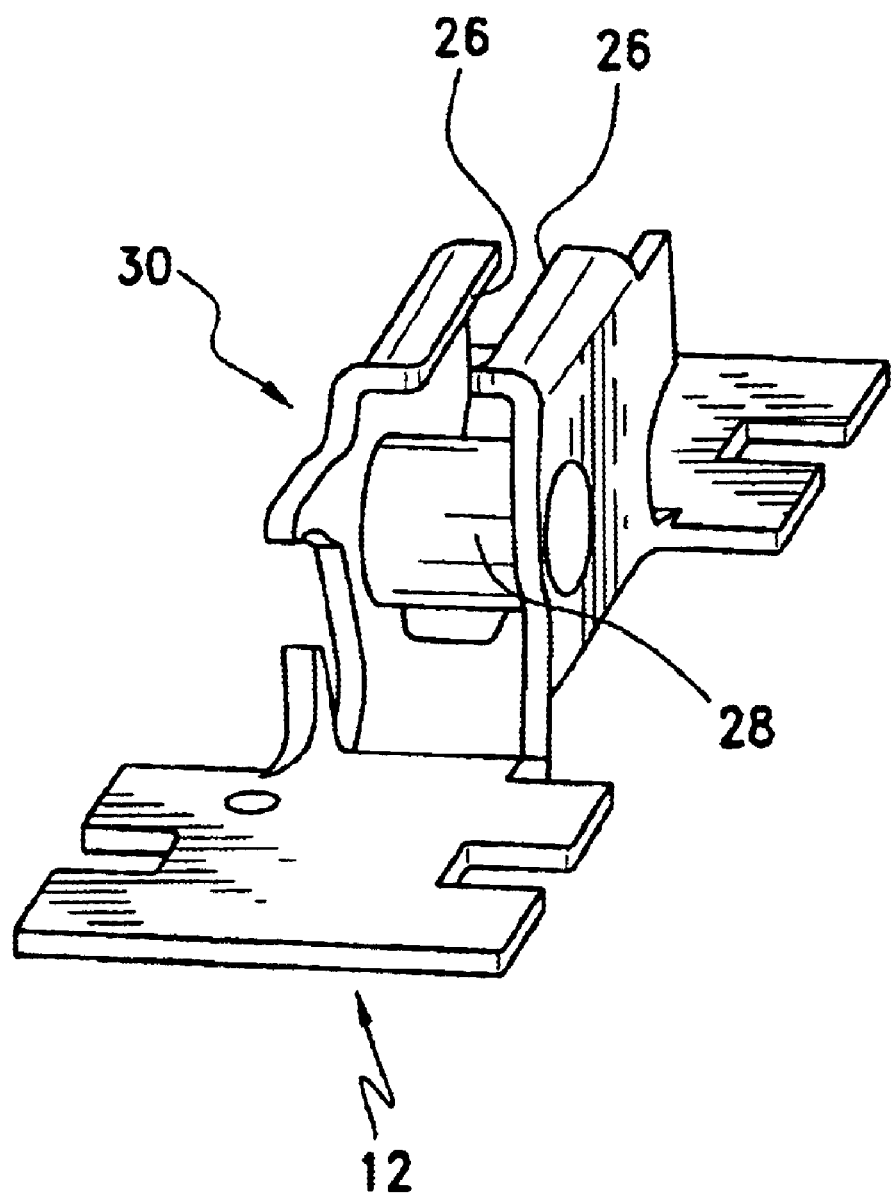
FIG. 2 shows a perspective view of the guide claw from FIG. 1.

FIG. 1 shows a guide arrangement with a carrier element 10 and a sliding element 12 in a schematic perspective. The carrier element 10 is intended for fixed mounting on the bottom of a cover (not shown) which is designed for closing or selectively clearing a roof opening which has been made in a motor vehicle roof, which can be, for example, a sliding roof, a sliding and lifting roof, or a spoiler roof. The sliding element 12 is designed to be movably guided by means of the engagement of sliding blocks (not shown) which can be mounted on sliding block sections 14 on the sliding element 12 in a body-mounted guide rail 11 in the lengthwise direction of the roof. The sliding element 12 can be driven by a compressively-stiff drive cable.

The carrier element 10 is provided on its bottom with a guide web 16 which is T-shaped in cross section, i.e., on either side of the carrier element 10, a section 18 of the guide web 16 projects laterally. The on the top 20 or bottom 22 of the sections 18, each section has a contact surface which slidably adjoins the corresponding upper or lower contact surfaces 26, 28 which are provided on the section of the sliding element 12 which is made as the guide claw 30. The claw 30, in this way, extends around the guide web 16.

The guide web 16 is made such that it runs at a different level in the vertical direction of the roof. In this way, when the guide claw 30 is pushed in the lengthwise direction with respect to the carrier element 10, a raising or pivoting motion of the carrier element 10, and thus of the cover attached to it, can be induced and controlled.

The carrier element 10 can be made, for example, as a sheet-metal part, and the guide web 16 can be spray-jacketed, for example, with POM. However, the entire carrier element 10 can also be made of plastic, for example, POM.

The structure of the guide claw 30 is explained in greater detail below in connection with several embodiments.

Figure 3:
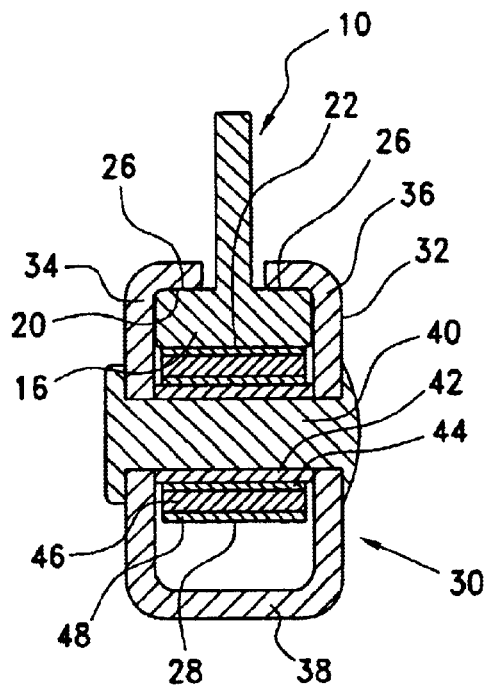
FIG. 3 shows a cross section through the guide arrangement from FIGS. 1 and 2.

In the embodiment as shown in FIG. 3, the guide claw 30 comprises a profile 32 having two side walls 34, 36 and a bottom 38. The walls 32, 34 are bent to the inside in their upper section in order to form solid upper contact surface 26 of the claw 30 on the bottom of the section which is bent to the inside. An axle 40 is mounted by means of the corresponding holes in the transverse direction between the two walls 34, 36 and is formed by a rivet. The rivet 40 is surrounded by a spacer sleeve 42 which, in turn, is surrounded by a rotary sleeve 44. The riveted-in spacer sleeve 42 is used to stabilize the walls 34, 36 of the profile 32, and thus, to stabilize the entire claw 30. The rivet 40, the spacer sleeve 42 and the two walls 34 and 36 are joined positively and non-positively to one another.

The rotary sleeve 44 is surrounded by a sleeve-like elastic element 46 which is made of elastic material and which, for its part, is surrounded by a sliding sleeve 48. The sliding sleeve 48 forms the lower contact surface 28 of the claw 30 which is engaged with the lower contact surface 22 of the guide web 16. The rotary sleeve 44 is used to support the elastic element 46 and the sliding sleeve 48 to be able to turn relative to the rivet 40 or the spacer sleeve 42, by which the sliding friction is converted essentially into rolling friction when the claw 30 engages the guide web 16. In this way, the required drive forces and the wear are clearly reduced.

Since the elastic element 46 can be compressed, the axis of rotation of the sliding sleeve 48 can be shifted with respect to the axis of rotation of the rotary sleeve 44, by which the opposing contact surfaces 28, 26 of the claw 30 can be moved in order to equalize production tolerances in the guide web 16 or the guide claw 30, so that both tightness and excessive play can be reliably prevented.

Figure 4:
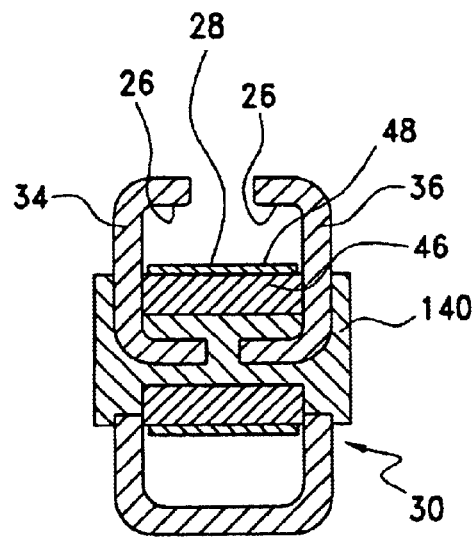
FIGS. 4 to 7 show views like FIG. 3, however of modified embodiments of the invention.

In the embodiment as shown in FIG. 4, the rotary sleeve 44 is omitted; this is possible if the elastic element 46 slides directly on the axle 140 or if the rotational capacity of the contact surface 22 or the sliding surface 28 can be eliminated. In the embodiment shown in FIG. 4, the axle 140 is injection molded into the claw 30.

Figure 5:
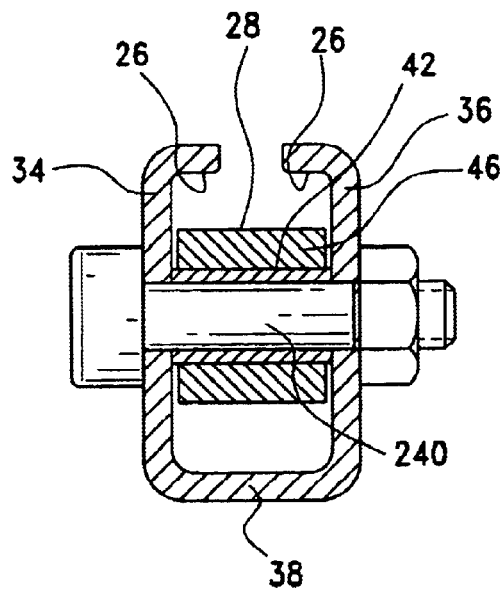

In the embodiment as shown in FIG. 5, the sliding sleeve 48 is omitted; this is possible when the material of the elastic element 46 interacts with the material of the guide web 16 in a favorable manner in order to keep the friction, and thus the wear, low. The contact surface 28 is made directly on the outside of the elastic element 46. The axle 240 is made in the embodiment as shown in FIG. 5 as a screw axis.

Figure 6:
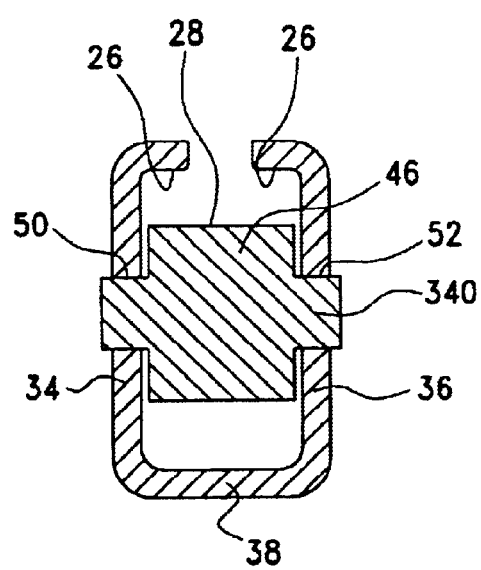

In the embodiment shown in FIG. 6, the axle 340 is made integral with the elastic element 46, and the axle 340 can be rotatably or pivotably supported in the holes 50, 52 in the walls 34, 36. Alternatively, the axle 340 can be permanently connected to one or both walls 34, 36 if the rotational capacity of the contact surface 28 can be eliminated.

Figure 9:
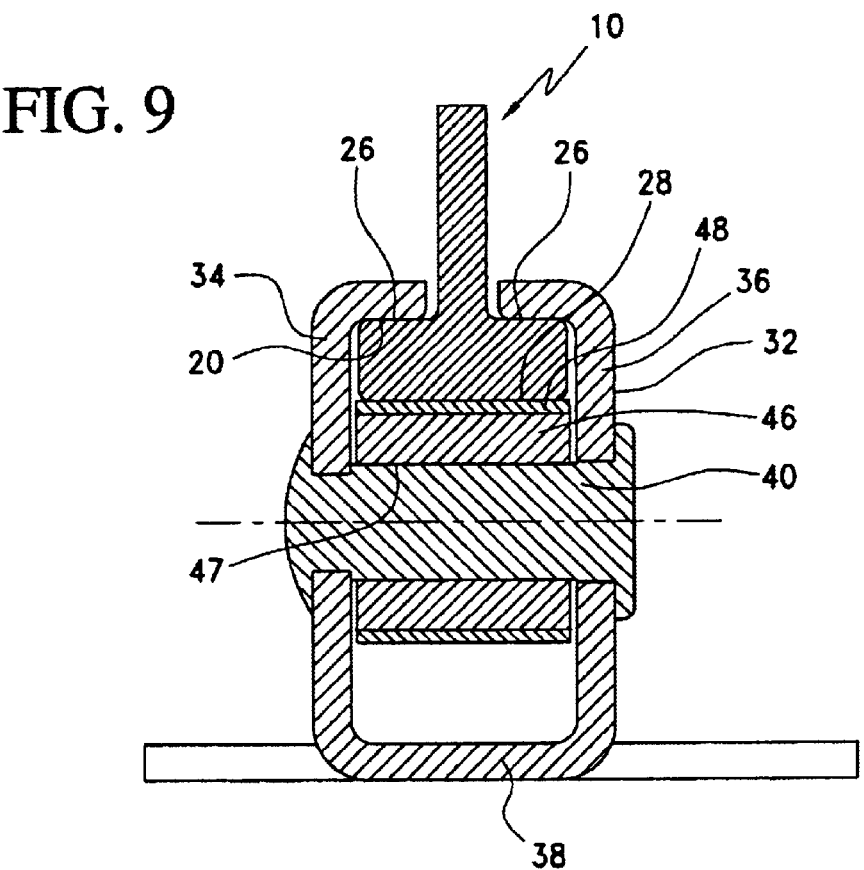
FIG. 9 is a view like FIG. 3, but of a modified embodiment of the invention.
Figure 10:
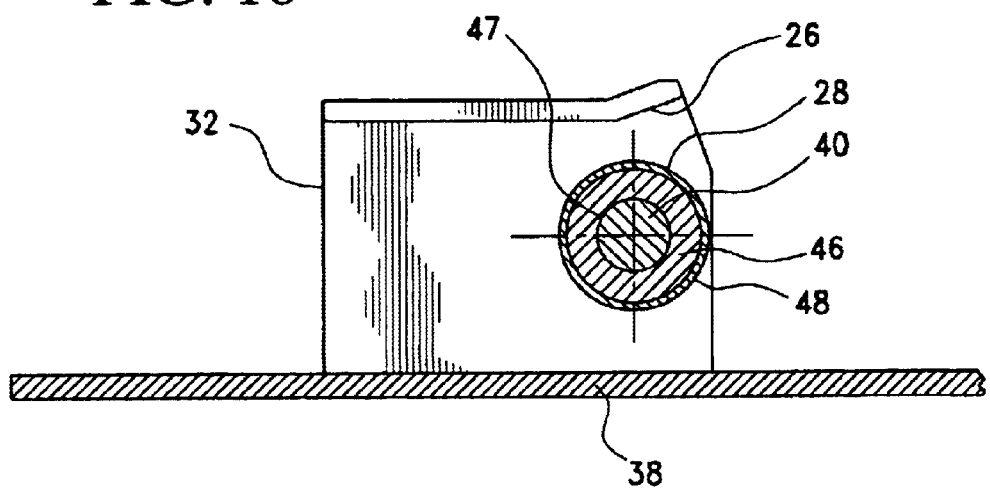
FIG. 10 shows a section taken along line X—X from FIG. 9, however, with the guide web being omitted.

FIGS. 9 & 10 show an embodiment in which both the spacer sleeve and also the rotary sleeve are omitted. The elastic element 46 is made of rubber and surrounds a pin 40 made as a rivet, the elastic element 46 being able to turn on the surface 47 on the pin 40. The elastic element 46 bears a sliding sleeve 48 of harder material on its outside periphery which forms the contact surface 28. The engagement of the pin 40 prevents the two side walls from being able to move apart. The sliding sleeve 48 prevents the two side walls 34, 36 from being able to move further inside toward one another, as corresponds to the width of the sliding sleeve 48.

The axle can, as shown, be made, for example, as a rivet or as a screw, and the rivet and the spacer sleeve can also be replaced by a pressed-in bolt. The contact surface 28, if it can turn around the axis, can be made as a circular cylinder or roller surface; if the rotational capacity can be eliminated, the contact surface 28 can also assume a different shape.

Figure 7:
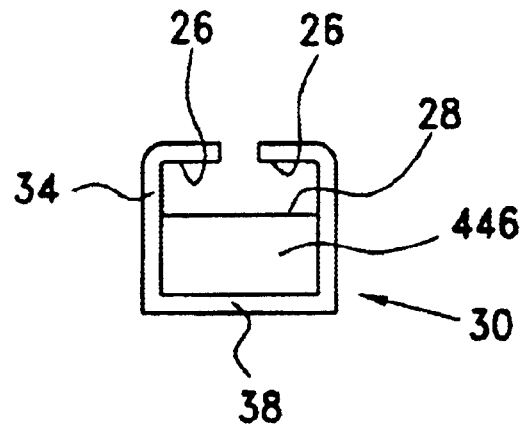

FIG. 7 shows a modified embodiment in which, above the bottom 38 of the guide claw 30, the elastic element 446 is provided as a block of elastic material and forms the contact surface 28. The elastic element 446 is supported by the bottom 38 of the guide claw 30.

In the embodiments described so far, the elastic element 46, 446 is preferably formed from a suitable plastic material or rubber.

Figure 8:
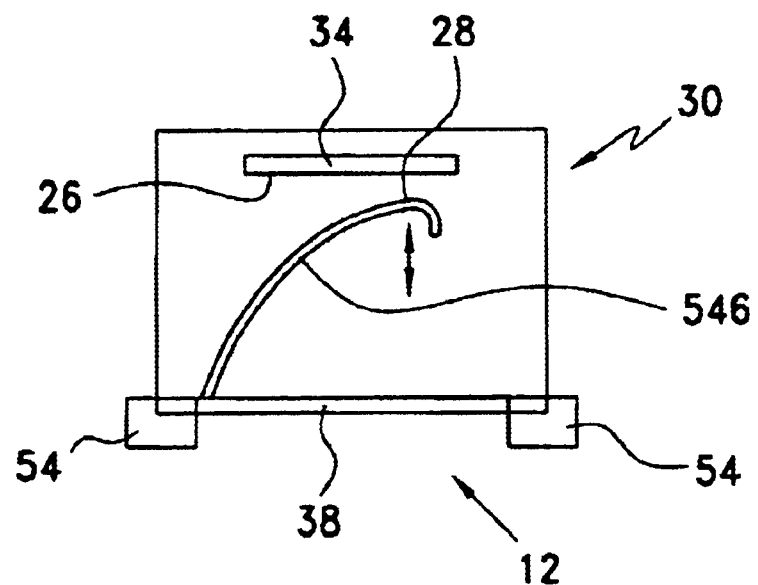
FIG. 8 is a side view of the guide claw according to another modified embodiment of the invention.

FIG. 8 shows an embodiment in which the elastic element 546 is formed by a spring which is flexible in the direction indicated with the arrows and which on its top forms the lower contact surface 28 which is opposite the upper contact surface 26. Furthermore, the sliding blocks 54 for the sliding element 12 are indicated in FIG. 8.

In all embodiments, the guide web is not limited to the described T-shaped cross sectional shape. Instead, it can have for example also an L-shaped cross sectional shape.

What is claimed is:

1. A guide arrangement for a roof element of an openable motor vehicle roof, comprising:
   a guide web for connection to the roof element, and
   a guide claw having opposing guide surfaces and which surrounds the guide web such that the guide surfaces adjoin the guide web,
   wherein the guide claw includes an elastic element on one of the guide surfaces which enables the one guide surface to be adjustable in order that the distance between the guide surfaces can be changed for purposes of tolerance equalization;
   wherein the guide claw has a profile which includes the elastic element on the one guide surface, and a stationary guide surface; and
   wherein the guide claw includes an axle supporting the elastic element.

2. The guide arrangement as claimed in claim 1, wherein the guide web has one of a T-shaped and an L-shaped cross section.

3. The guide arrangement as claimed in claim 1, wherein the guide claw is made of metal.

4. The guide arrangement as claimed in claim 1, wherein the elastic element includes an adjustable guide surface formed by a spring element.

5. The guide arrangement as claimed in claim 1, wherein the elastic element includes an adjustable guide surface that is rounded.

6. A guide arrangement for a roof element of an openable motor vehicle roof, comprising:
   a guide web for connection to the roof element, and
   a guide claw having opposing guide surfaces and which surrounds the guide web such that the guide surfaces adjoin the guide web,
   wherein the guide claw includes an elastic element on one of the guide surfaces which enables the one guide surface to be adjustable in order that the distance between the guide surfaces be changed for purposes of tolerance equalization;
   wherein the elastic element includes an adjustable guide surface that is roller-shaped.

7. The guide arrangement as claimed in claim 6, wherein the elastic element includes an adjustable guide surface that is one of rotatable and pivotable with respect to the claw.

8. The guide arrangement as claimed in claim 7, wherein the claw includes an axle on which the adjustable guide surface is one of rotatably and pivotally supported.

9. The guide arrangement as claimed in claim 8, wherein the axle includes a rotary sleeve which provides rotary support for the elastic element formed as a sleeve which surrounds the axle.

10. The guide arrangement as claimed in claim 8, wherein the axle is surrounded by a spacer sleeve.

11. The guide arrangement as claimed in claim 7, wherein the elastic element is formed as a rotary piece which includes an axle which is one of rotatably and pivotally supported with respect to the claw.

12. The guide arrangement as claimed in claim 1, wherein one guide surface of the guide claw forms an upper guide surface and the other guide surface of the guide claw forms a lower guide surface which is adjustable by the elastic element.

13. The guide arrangement as claimed in claim 1, wherein the guide web is made of POM or is spray-jacketed with POM.

14. The guide arrangement as claimed in claim 1, wherein the roof element is a cover.

15. The guide arrangement as claimed in claim 1, wherein the claw is movable in a lengthwise direction along a roof-mountable guideway.

* * * * *